United States Patent
Panoushek et al.

(10) Patent No.: US 6,169,953 B1
(45) Date of Patent: Jan. 2, 2001

(54) METHOD AND APPARATUS FOR PROTECTING AN ENGINE FROM OVERHEATING

(75) Inventors: Dale William Panoushek, Orion; Jon Robert Cross, Lynn Center, both of IL (US)

(73) Assignee: Case Corporation, Racine, WI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/925,209

(22) Filed: Sep. 8, 1997

(51) Int. Cl.⁷ .............................. G06F 19/00; G06G 7/70
(52) U.S. Cl. .................... 701/99; 123/41.12; 123/41.15; 123/198 D; 340/438; 340/449; 165/11.1; 165/287; 165/42
(58) Field of Search .................. 701/99, 29, 50, 701/36; 73/118.1, 117.3, 116; 340/449, 451, 439, 438, 459, 460, 463; 123/41.15, 198 D, 612, 613, 617, 406.57, 406.55, 41.01, 41.02, 41.12, 196 AB, 196 S, 198 R, 198 DB; 374/145; 165/11.1, 287–290, 41–43, 299

(56) References Cited

U.S. PATENT DOCUMENTS

| | | | | |
|---|---|---|---|---|
| 4,325,330 | * | 4/1982 | Kugler et al. | 123/41.12 |
| 4,422,354 | * | 12/1983 | Bandy | 477/98 |
| 4,695,822 | * | 9/1987 | Furukawa | 123/41.15 |
| 4,733,540 | * | 3/1988 | Sakurai | 62/133 |
| 4,768,484 | * | 9/1988 | Scarselletta | 123/41.21 |
| 4,944,260 | * | 7/1990 | Shea et al. | 123/179.21 |
| 4,953,110 | * | 8/1990 | Chartrand | 701/110 |
| 5,038,743 | * | 8/1991 | Remmers | 123/406.57 |
| 5,117,898 | | 6/1992 | Light et al. | 165/34 |
| 5,133,303 | * | 7/1992 | Umehara | 123/41.15 |
| 5,201,284 | * | 4/1993 | Umehara | 123/41.15 |
| 5,331,560 | * | 7/1994 | Tamura | 701/113 |
| 5,422,517 | * | 6/1995 | Verney et al. | 307/29 |
| 5,455,769 | | 10/1995 | Panoushek et al. | 701/50 |
| 5,507,251 | * | 4/1996 | Hollis | 123/41.1 |
| 5,522,219 | * | 6/1996 | Orzel et al. | 60/274 |
| 5,526,871 | * | 6/1996 | Musser et al. | 165/11.1 |
| 5,529,028 | | 6/1996 | Weikert | 123/41.12 |
| 5,538,472 | * | 7/1996 | Panoushek et al. | 460/119 |
| 5,656,771 | * | 8/1997 | Beswick et al. | 73/118.1 |

OTHER PUBLICATIONS

Brochure from Case Corporation entitled 2100 Series Axial–Flow® Combines, © 1994 Best Copy Available.
Brochure from Case Corporation entitled 2155 Cotton Express, © 1994.
Brochure from Case Corporation entitled 8800/8200 Series Windrowers, © 1995.
Brochure from Case Corporation entitled Buyer's Guide, © 1996.
Brochure from Case Corporation entitled 2300 Series Combines, © 1997.

* cited by examiner

*Primary Examiner*—Jacques H. Louis-Jacques
(74) *Attorney, Agent, or Firm*—Foley & Lardner (57) ABSTRACT

An apparatus is disclosed for protecting an engine of a vehicle driving a load from overheating. The apparatus comprises a sensor configured to provide a temperature signal representative of a temperature of the engine of the vehicle, a controller responsive to the temperature signal and configured to provide a control signal, and an instrumentation system responsive to the control signal and configured to provide a warning signal. The warning signal is provided when the temperature of the engine is within a warning range, and the load is disengaged when the temperature of the engine is within an overheat range.

29 Claims, 7 Drawing Sheets

METHOD AND APPARATUS FOR PROTECTING AN ENGINE FROM OVERHEATING

FIELD OF THE INVENTION

The present invention relates to a method and apparatus for protecting an engine from overheating. In particular, the present invention relates to a method and apparatus for protecting the engine from overheating by disengaging or deactivating a load driven by the engine when the temperature of the engine reaches an operating temperature greater than a predetermined threshold temperature.

BACKGROUND OF THE INVENTION

In the design and use of work or agricultural vehicles, it is desirable to obtain from the engine or power plant as much output power as is reasonably available to drive the vehicle and associated equipment driven by the engine (e.g. loads). However, under normal operating conditions, operating the engine under heavy load will result in higher engine temperatures.

It is known that operating the engine under heavy load enhances the risk of overheating the engine, which in time may cause damage to or reduce the useful life of the engine. Operating the engine at high temperature also poses the risk of breakdown, serious malfunction and damage, such as the seizing or locking of certain moving engine parts. For work or agricultural vehicles, which often operate in adverse environmental conditions, such as high ambient temperatures, for extended durations, often while driving substantial loads (such as harvesting equipment), the risk of overheating the engine may be substantial.

Accordingly, it would be advantageous to provide information relating to the temperature of the engine to the operator of the vehicle using a warning lamp, an audible alarm and a display associated with the instrumentation system of the vehicle. It would also be advantageous to have a method and apparatus to monitor the temperature of the engine of a vehicle and to disengage or deactivate a load from the engine when the engine begins to overheat.

SUMMARY OF THE INVENTION

The present invention provides an apparatus for protecting an engine of a vehicle driving a load from overheating. The apparatus comprises a sensor configured to provide a temperature signal representative of a temperature of the engine of the vehicle, a controller responsive to the temperature signal, configured to provide a control signal and further configured to disengage the load when the temperature of the engine is within a danger range and an instrumentation system responsive to the control signal and configured to provide at least one warning signal. The warning signal is provided when the temperature of the engine is within a warning range, and the load is disengaged when the temperature of the engine is within the danger range.

The present invention also provides a method of protecting an engine of a vehicle driving a load from overheating. The method comprises the steps of detecting a temperature signal indicative of a temperature of the engine, determining from the temperature signal whether the temperature of the engine is within a warning range, providing a warning signal if the temperature of the engine is within the warning range, determining from the temperature signal whether the temperature of the engine is within an overheat range, and disengaging the load if the temperature of the engine is within an overheat range.

The present invention further provides an apparatus which comprises means for detecting a temperature signal indicative of a temperature of the engine, means for determining from the temperature signal whether the temperature of the engine is within a warning range, means for providing a warning signal if the temperature of the engine is within the warning range, means for determining from the temperature signal whether the temperature of the engine is within an overheat range, and means for disengaging the load if the temperature of the engine is within an overheat range.

The present invention further provides an apparatus for protecting an engine driving a load from being damaged. The apparatus comprises a sensor configured to provide a signal representative of an engine parameter and a controller responsive to the sensor signal and configured to disengage the load from the engine if the engine parameter is within a danger range.

DESCRIPTION OF THE PREFERRED EMBODIMENTS

The method and apparatus of the present invention is well-suited for use with work vehicles, such as agricultural harvesting vehicles. Agricultural harvesting vehicles of a particularly suitable type are shown in the brochures for the Case Corporation 2100 Series Axial-Flow® Combines (No. AE 087114 ©1994), 2155 Cotton Express Pickers (No. AE 088114 ©1994) and 8800/8200 Windrowers (No. AE 084094 ©1994), which are incorporated by reference herein. The method and apparatus is also suitable for use with a wide variety of other agricultural or work vehicles such as those disclosed in the Case Corporation Buyer's Guide (No. AE 166076 ©1996), which is incorporated by reference herein.

Figure 1:
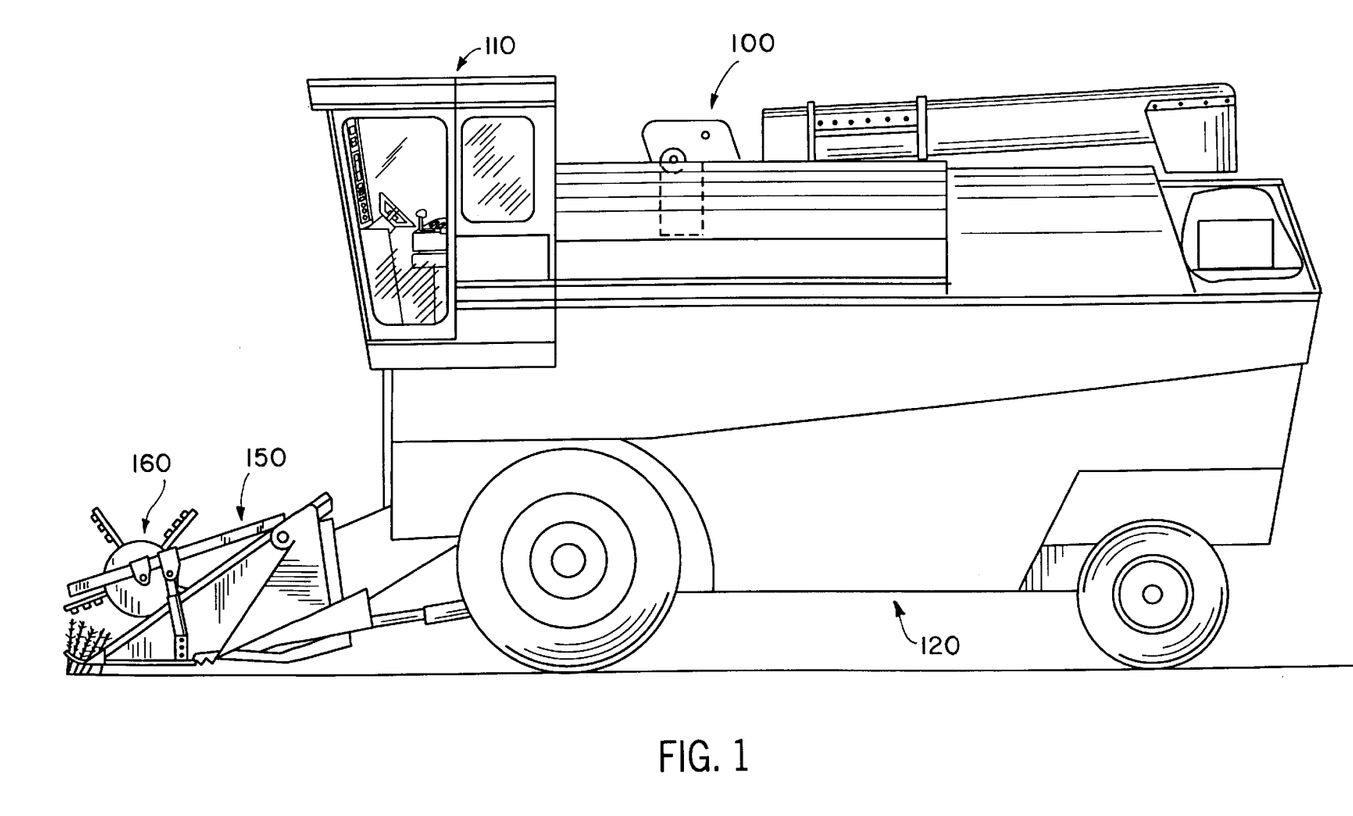
FIG. 1 is an exemplary work vehicle according to a preferred embodiment of the present invention.

Referring to FIG. 1, an exemplary agricultural harvesting vehicle is shown in the form of a combine 100. Combine 100 is intended to be representative of the Case® 2100 Series Axial-Flow® Combines (such as Model 2144, Model 2166 and Model 2188). Combine 100 has a cab 110 (wherein an operator is seated and is provided with a variety of instruments and operator controls) mounted on a base 120 and chassis (typically having four wheels). Also mounted on base 120 is an engine or power plant 130 (shown schematically in FIG. 2) which powers the drive train, hydraulic system (if present) and various other tools or implements (such as a harvesting header or head). For example, as shown in FIG. 1, combine 100 includes a harvesting header (or head) 150 which is mounted at the front end of the vehicle. Header 150 includes a rotating reel 160 into which matter to be harvested is gathered. A header or head of an exemplary type is disclosed in U.S. Pat. No. 5,455,769 titled "COMBINE HEAD RAISE AND LOWER RATE CONTROL" issued to Panoushek et al., commonly assigned, and incorporated by reference herein. Also representative of headers or heads of a pertinent type are the Case Model 1010 or 1015 Grain Headers, Model 1020 Flexible Cutterbar Header, Model 1063 Corn Head or other 1000 Series corn heads.

Figure 2:
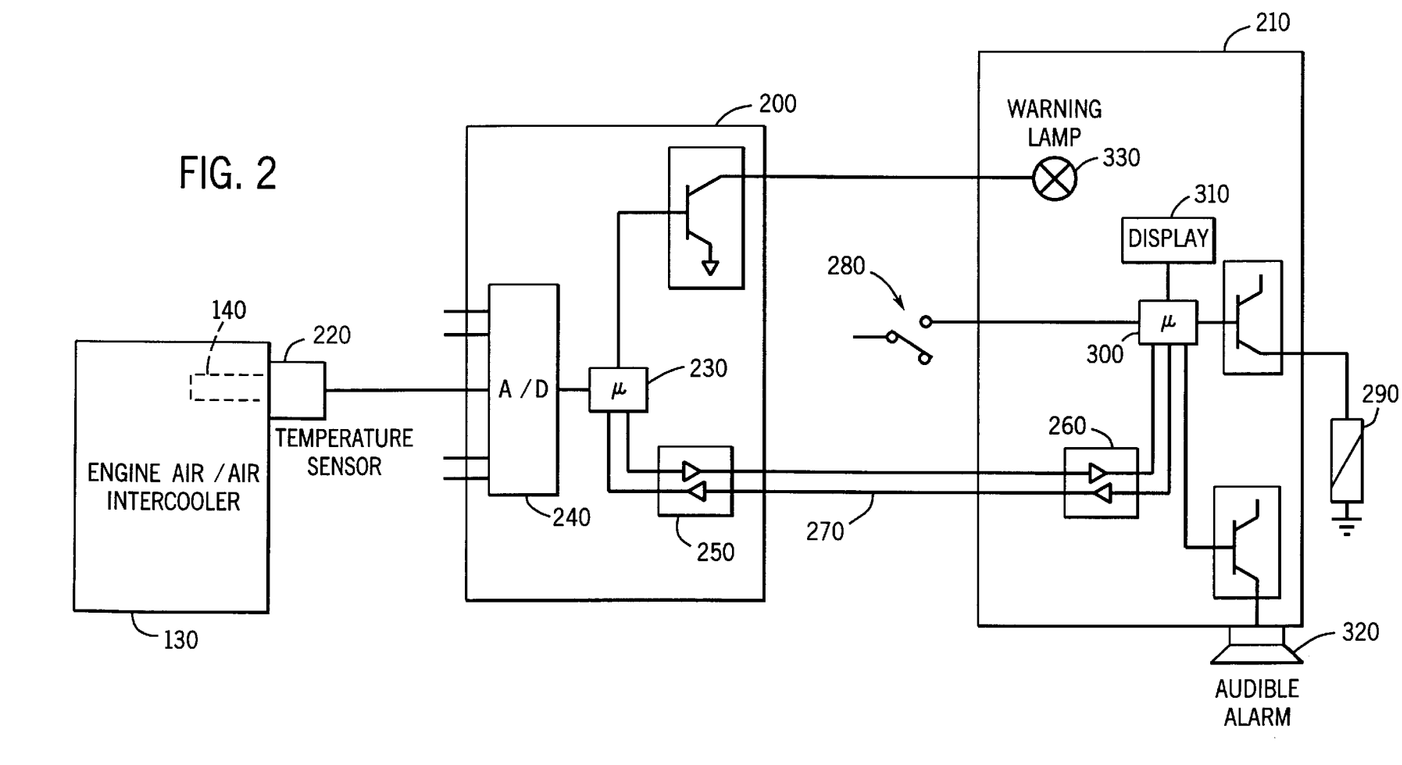
FIGS. 2 through 5 are schematic diagrams of the instrumentation and operator interfaces within the cab of the vehicle.

Referring to FIG. 2, a schematic diagram of an apparatus for protecting the engine of an agricultural or work vehicle such as combine 100 is shown, according to a preferred embodiment of the present invention. The vehicle (e.g. combine 100) is preferably of a type having an engine 130 with an associated engine air/air intercooler 140 (shown schematically), a central controller 200 (shown schematically) and an instrumentation system 210 (shown schematically).

Associated with intercooler 140 (e.g. in proximity to the engine) is an engine air temperature sensor 220 (such as a negative resistive element or like temperature measuring device) (shown schematically) which provides an electrical signal representative of the engine air temperature. Engine air temperature sensor 220 is installed so as to provide a signal (i.e. sensed values) indicative of the temperature of the air in the vicinity of the engine, which will generally relate to the actual operating temperature of the engine. In alternative embodiments, any type of a wide variety of sensors or detectors (such as thermocouples) known in the art can be employed to provide a suitable signal indicative of the engine air temperature to controller 200. The signal provided by engine air temperature sensor 220 can be transformed or calibrated into a signal indicative of engine air temperature by the control program (of controller 200), which includes the necessary parameters to calculate the transformation.

Controller 200 is an electronic device (e.g. of a type described in U.S. Pat. No. 5,455,769, which is incorporated by reference herein), which can be configured to monitor and control various systems of the vehicle, such as the engine (e.g. throttle and timing) and implements or tools (such as a header or feeder or the like). Controller 200 includes a digital processor 230 (e.g. an Intel 80C198 microprocessor/controller), an analog-to-digital (A/D) converter 240 (typically having one or more channels for data acquisition), and a communications port 250 (e.g. permitting two-way communications over a serial data link 270, such as a RS-485 interface). According to a preferred embodiment, analog signals from engine air temperature sensor 220 (and other vehicle systems) are converted to digital signals through an analog-to-digital converter 240 at the interface with controller 200. (Data and electronic signals from other vehicle systems also may be provided to controller 200.) For example, an analog electronic signal provided by an engine air temperature sensor 220 is provided to the A/D converter 240 and presented to the digital processor 230 of controller 200 in the form of a digital signal representative of the engine air temperature. Similarly, other external signals (whether analog or digital) provided or monitored by various vehicle systems are thereby transferred into data signals that can be processed by digital processor 230 (according to arrangements well-known to those of skill in the art who may review this disclosure).

Controller 200 is configured to implement a control system for protecting the engine from overheating. The control system can be in the form of a control program that is loaded or programmed into controller (which according to a particularly preferred embodiment comprises a programmable digital processor or microprocessor but according to alternative embodiments can comprise other devices programmable in either hardware or software or some suitable combination thereof). The control system according to any preferred embodiment will accept data input signals from sensors (e.g. engine air temperature sensor 220) and from instrumentation system 210 and, based on the values of the data input signals in comparison with certain control criteria according to the control program, will provide appropriate output control signals such as the operator warnings and other information and ultimately will protect the engine from overheating (by disengaging or deactivating the driven load). The control criteria may be data values (typically loaded or stored in program memory of the controller) representative of geometric, dimensional, mass, dynamic and thermal properties of the pertinent vehicle systems, as well as other such parameters as would describe the system to allow stable control.

Figure 7:
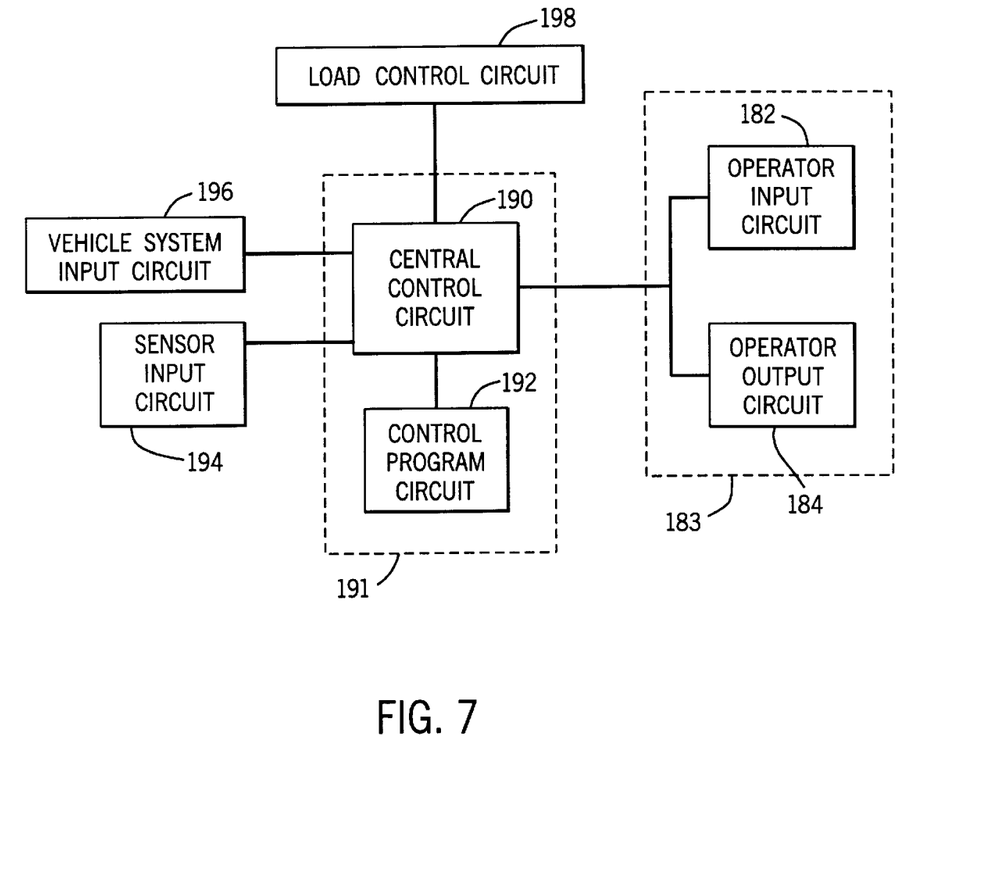
FIG. 7 is a block diagram of representative circuits and data flow for the control system of a work vehicle according to a preferred embodiment of the present invention.

According to any preferred embodiment, controller 200 includes a programmable digital processor 230 as its central control circuit 190, as shown schematically in FIG. 7, and also a control program circuit 192 (e.g. program memory or the like) in connection with other basic representative circuits including a sensor input circuit 194, a vehicle system input circuit 196 (which may also be combined with a vehicle system output circuit), a load control circuit 198, an operator input circuit 182, and an operator output (or indicator) circuit 184 (to provide indications to the operator regarding the state of vehicle systems and processes). According to an alternative embodiment, operator input circuit 182 and operator output circuit 184 can be integrated into an operator interface 183 contained in the control panel. Each of the input circuits 194, 196, 198 and 182 provides suitable analog-to-digital conversion along with any necessary filtering and isolation to apply a digital signal of a suitable value range to central control circuit 190. (Each control output circuit will provide for suitable conversion of the output signal to a suitable value range.) Control program circuit 192 is programmed with a control program including the control function and control criteria to implement the control function based on the various system input signals (from the input circuits 194, 196, 198 and 182) and based on parameters that define the physical system of the combine and its various systems. These parameters would ordinarily be calibrated and adjusted for a particular work vehicle (or type of work vehicle) to prevent error conditions or invalid values from being programmed or stored as control criteria.

Controller 200 is linked to instrumentation system 210, which provides status and other operational information for the operator of the vehicle. As shown, instrumentation system 210 includes a digital processor 300 (e.g. a Motorola 68HC11 microprocessor/controller) to facilitate two-way data communications with controller 200 and to coordinate and facilitate the display or communication of information to the vehicle operator (or other persons) and/or other vehicle systems. As is evident, controller 200 and instrumentation system 210 are coupled by a data link 270 (shown as an RS-485 serial communications link) to allow high-speed data transmission therebetween (e.g. 62.5 Kbaud). In operation, controller 200 (serving as the "master") provides data to be interpreted and routed by instrumentation system 210 (serving as the "slave").

According to the embodiment shown in FIG. 1, the vehicle is a type of agricultural vehicle (e.g. a combine) having a feeder associated with a header. The feeder is energized (i.e. activated) by a switch (e.g. shown as solenoid) 280 coupled to digital processor 300 of instrumentation system 210; the operator of the vehicle is provided with switch 280 at instrumentation system 210 through which the feeder can be manually switched into and out of operation (by energizing solenoid 290). The feeder is representative of a typical load that is driven by the engine of the vehicle. It is apparent that other types of loads may be viewed as similar to the feeder for purposes of the present invention. (For example, the vehicle may be provided with a hydraulic system coupled to the engine for providing actuating force to tools or implements associated with the vehicle such as header 150.) Instrumentation system 210 includes a display panel 310 (shown schematically in FIG. 2) capable of providing a message or other information (e.g. in an alpha-numeric or graphical format, or in a dial gauge or other instrument). Instrumentation system 210 also includes an audible alarm 320 (e.g. an electronic speaker or the like) that is capable of providing an audible warning or other signal. Display panel 310 and audible alarm 320 operate under the control of digital processor 300 of instrumentation system 210.

Instrumentation system 210 also includes a warning lamp 330 (shown schematically in FIG. 2) capable of providing a visual signal to the vehicle operator. (As shown, warning lamp 330 is directly coupled to the digital processor 230 of controller 200.) As is readily apparent, display panel 310, audible alarm 320, and warning lamp 330 may be configured (according to means and methods well-known to those of skill in the art who may review this disclosure) to provide a distinctive signal or other information based on a particular state or operating condition of the vehicle (as determined by controller 200).

Figure 3:
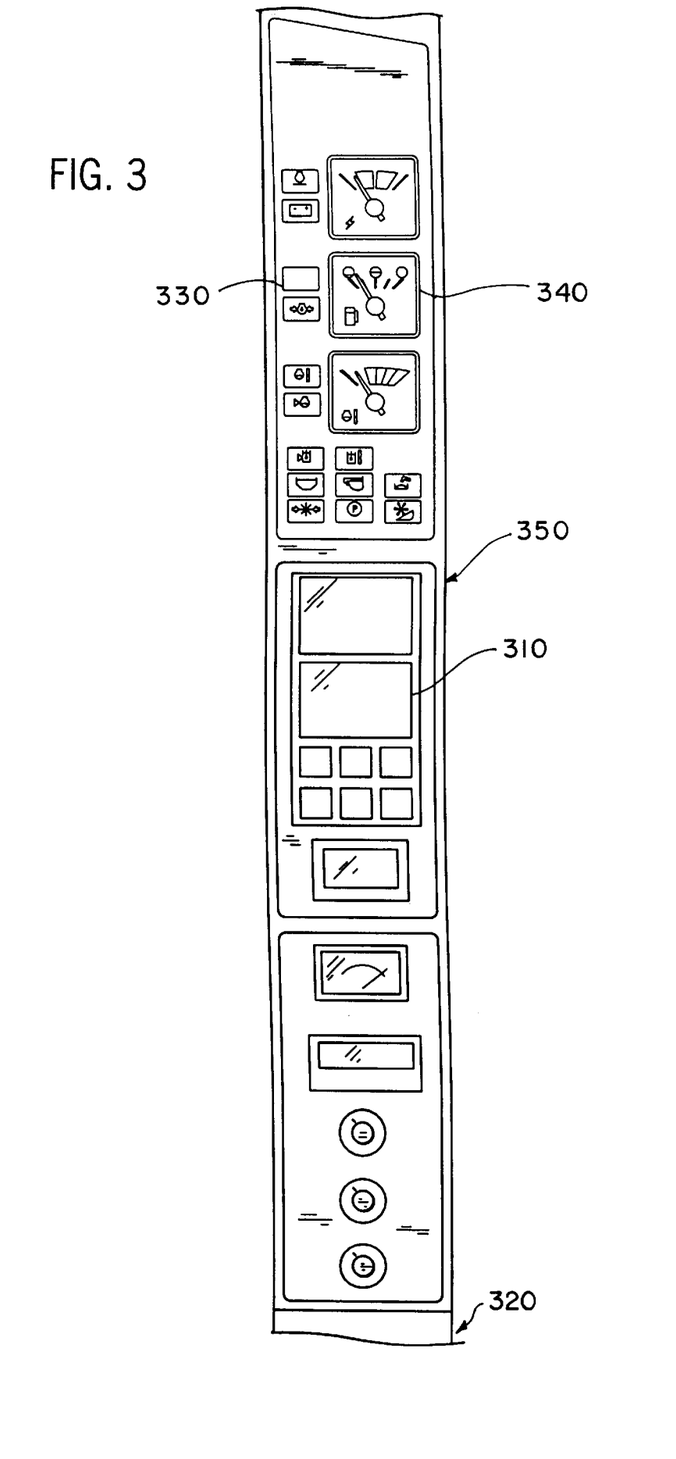

According to a particularly preferred embodiment relating to combine 100, as shown in FIG. 3, warning lamp 330 is located on an instrument panel 350, or may be alternatively located within the operator area of the combine. In a preferred embodiment it should be placed such that it is in plain view of the operator (e.g., to the right of the fuel gauge 340). Warning lamp 330 may be of any size, shape and color, but should be of a size, shape and color which will be readily identified by the operator as alerting to a warning state. In a particular embodiment of the invention, warning lamp 330 has a rectangular shape and a red lens, and is steadily lit or flashes at between 0.75 and 1.25 Hz. Audible alarm 320 should be located within the operator area of the combine 100 and may be of any suitable intensity or sound. In a preferred embodiment, audible alarm 320 will emit a sound of volume and intensity as can be readily identified by the operator as a warning state (requiring attention), notwithstanding ambient sound conditions heard by the operator including the noise of the combine including the feeder. In a preferred embodiment, audible alarm 320 is of a type such as Sonalert™ model number SC 628 having a range of between 68 and 80 dB, which produces a continuous beep. Audible alarm 320 is preferably round, having approximately a 1.5 inch diameter and may be mounted to the bottom of instrument panel 350, such that it extends to a chest-level of a seated operator. Information as to the status of the vehicle and vehicle systems are provided on a display 310, for example, the message that the feeder has been turned off is displayed on instrument panel 350 (or otherwise within the operator area of the combine). Display 310 is placed such that it is in plain view of the operator, according to a preferred embodiment. Display 310 may be of any size, shape and color, but should be of a size, shape and color which will be readily identified by the operator as an indicator which requires his attention. In a preferred embodiment, a message will replace the ground speed message in a ground speed indicator (also 310), and the message will be sequentially flashed, cycling through "HOT", "FDR", "OFF".

According to alternative embodiments, controller 200 and instrumentation system 210 can each employ a stand-alone digital processor or can be integrated with a digital processor (e.g. microprocessor 230 and 300) or the like used to monitor or control other vehicle systems and functions. An exemplary digital processor 191 (shown schematically in FIG. 7) can include program memory into which a set of data is stored and instructions that convert the set of data into special purpose computing device having particularized functionality, including the functions outlined in a flow chart shown in FIG. 6. The means and methods of programming digital processors of a type that can be used in controllers and instrumentation systems are well-known to those of skill in the art who may review this disclosure, and the present invention is not intended to be limited to any one particular type of hardware/software implementation of the functionality.

Figure 4:
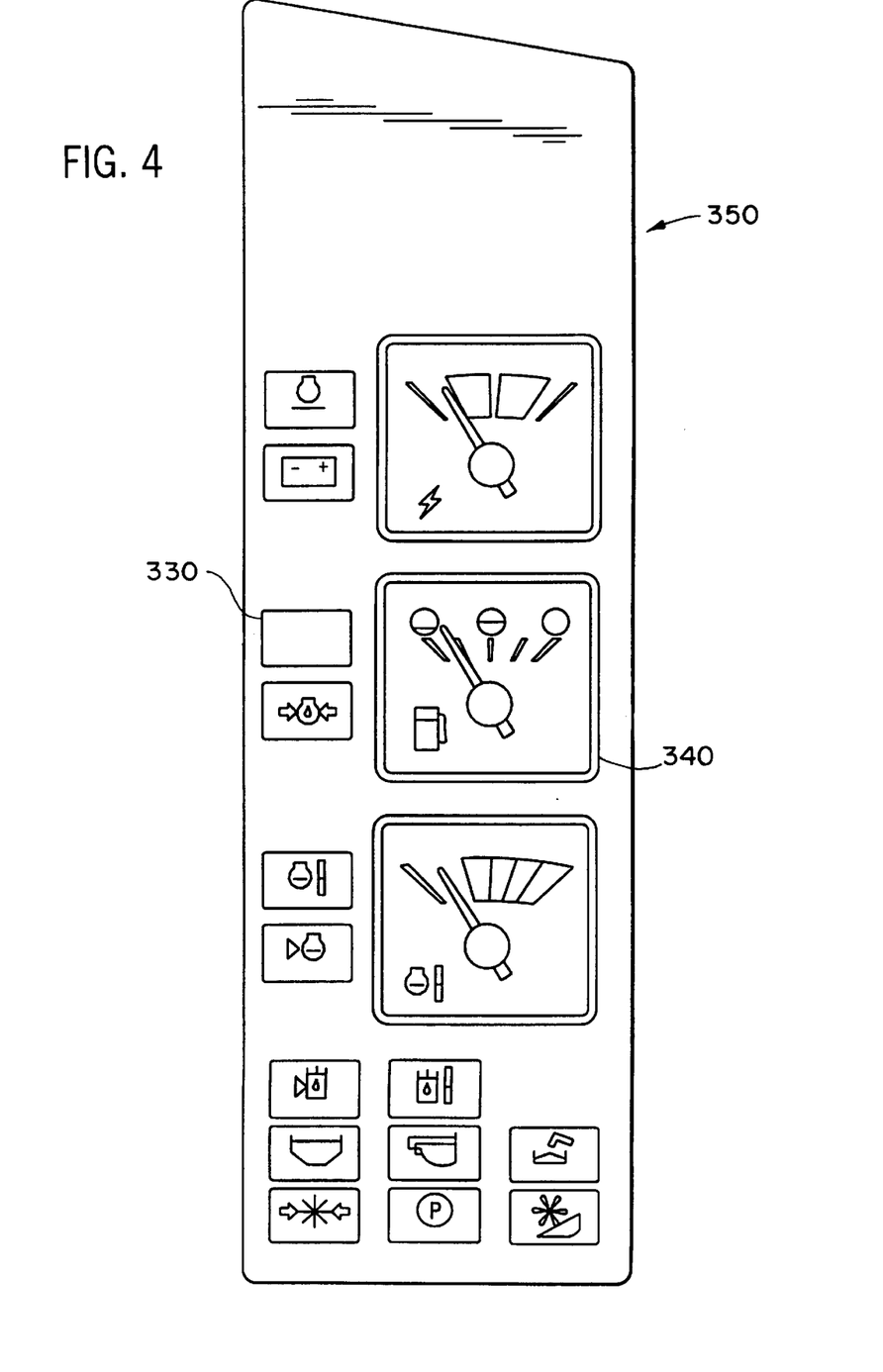
Figure 5:
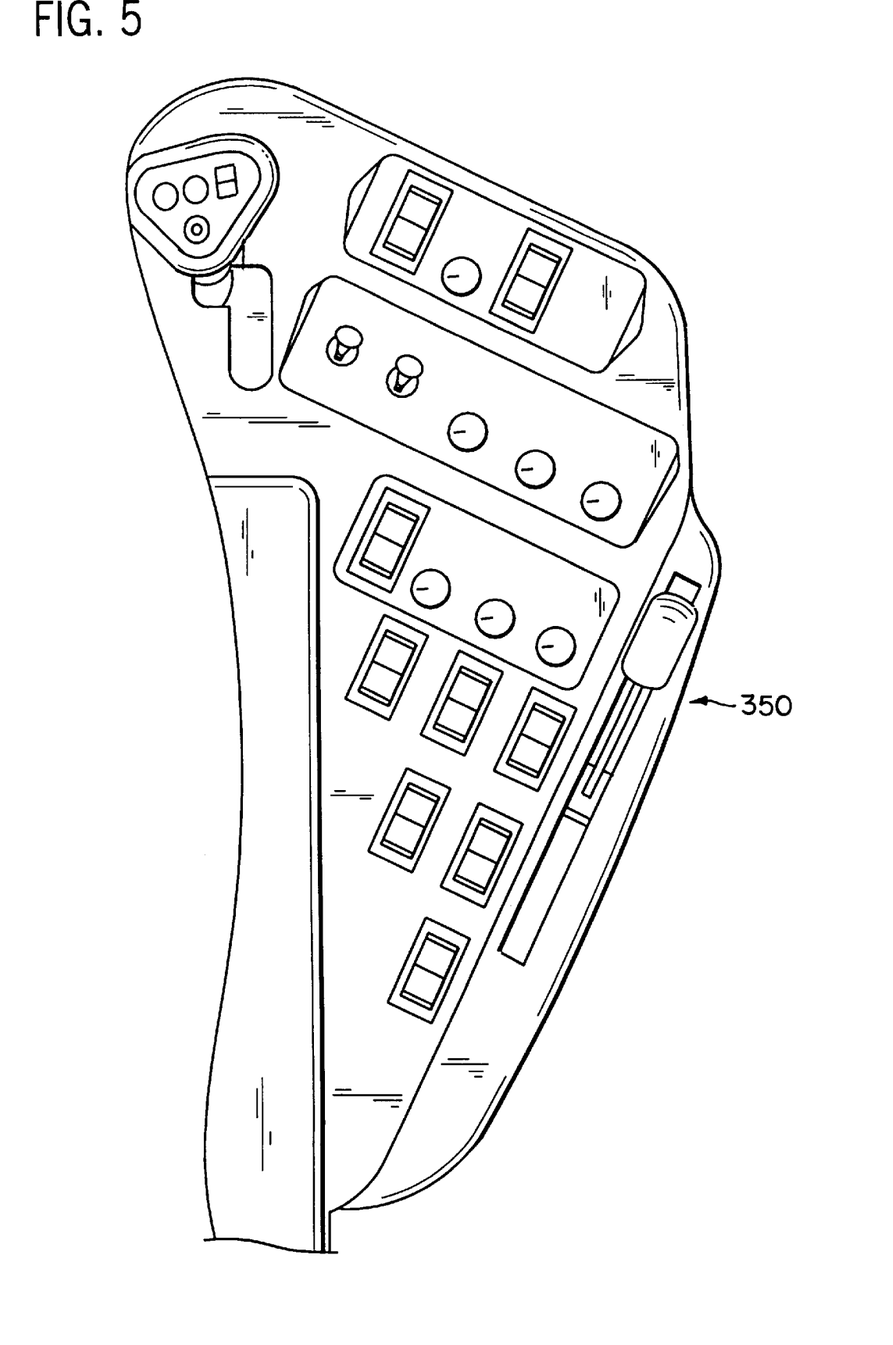

According to any preferred embodiment, the vehicle (e.g. combine 100) will be operated under the control and supervision of an operator. The operator provides certain commands from the control panel, at which various vehicle systems can be activated and monitored. Switches and controls are provided at the control panel so the operator can start or halt vehicle system processes if the need arises. At the control panel, various warning lights and displays are provided for the operator. The configuration of the control panel according to a preferred embodiment is shown in FIGS. 3 and 4.

Figure 6:
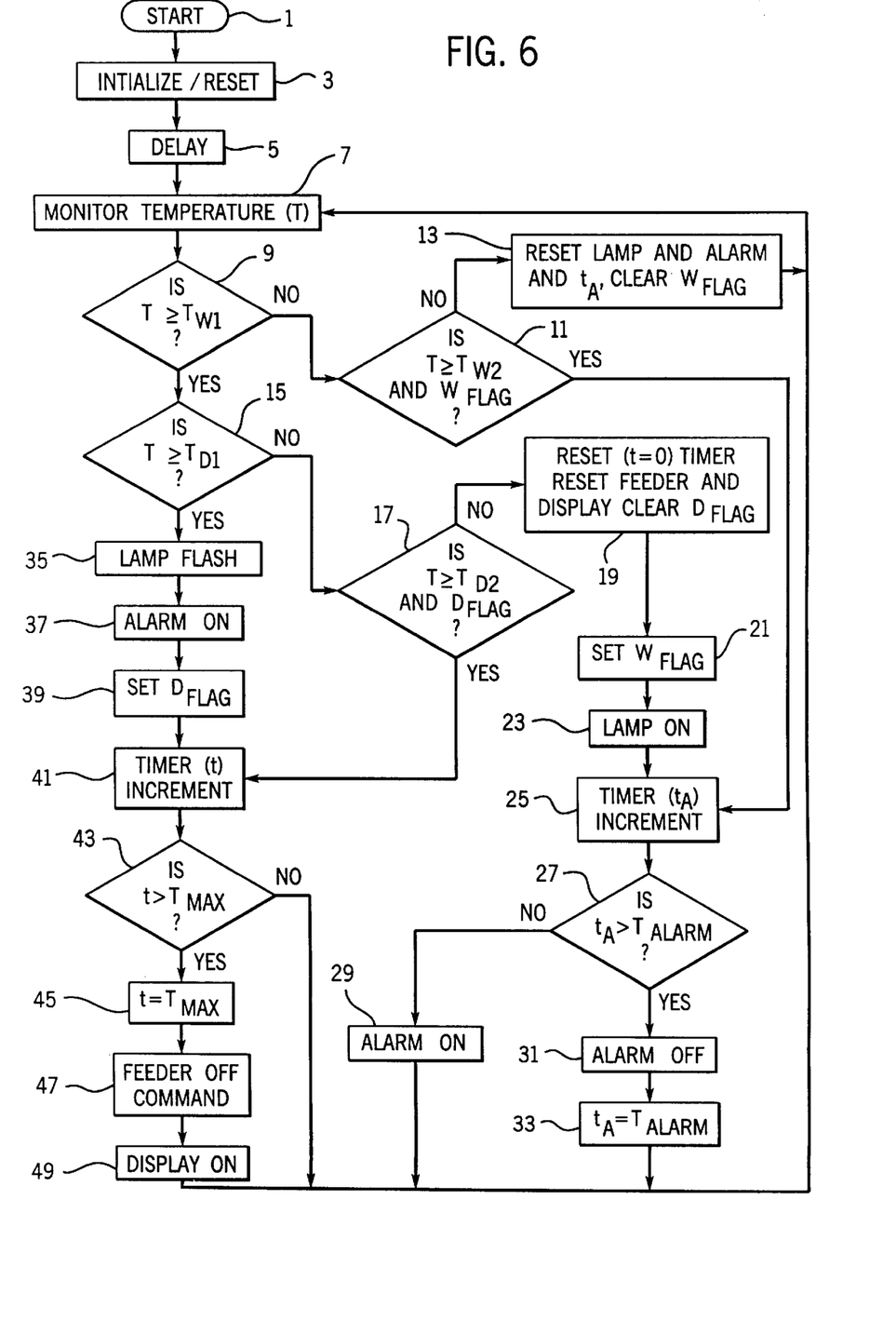
FIG. 6 is a flow chart representation of a control system for protecting an engine from overheating according to a preferred embodiment of the present invention.

The process implemented in the control system for protecting the engine from overheating, according to a particularly preferred embodiment, is illustrated in FIG. 6. The header/feeder is engaged or activated by the operator. As indicated, a certain level of operator interaction is relied upon in effecting the process. Moreover, the operator may intervene in the process by providing a command. In FIG. 6, a preferred embodiment of the method adapted for a combine (as in FIGS. 1 through 5) is shown. The combine is of a type having an attached header with a feeder driven by the combine engine. However, this process may be adapted for other types of agriculture or work vehicles, such as agricultural harvesting machines, which drive loads other than the header/feeder of a combine.

The process is started when the operator switches the ignition of the combine to "ON" (step 1). Typically, shortly thereafter, the operator will also engage the header/feeder and begin the harvesting operation, using operator controls provided within the cab of the combine.

According to a particularly preferred embodiment, the process provides for comparison of the engine air temperature with four reference temperatures. Two of the reference temperatures define a warning range, within which operation of the header/feeder may continue although the operator is alerted of the existence of a warning condition. The warning range is defined by an upper limit temperature ($T_{W1}$) and a lower limit temperature ($T_{W2}$). Two of the reference temperatures define a danger range, within which operation of the header/feeder may continue only for a limited period of time, the operator being alerted of the existence of a danger condition. The danger range is defined by an upper limit temperature ($T_{D1}$) and a lower limit temperature ($T_{D2}$).

At the outset of the process, the process is initialized and certain conditions are reset (step 3), e.g. the warning lamp is initialized to an "OFF" setting, the audio alarm is initialized to an "OFF" setting, and a timer is set at an initial value (e.g., t=0).

Following initialization at startup, an initial delay is provided (step 5) to give the operator an opportunity to start the combine in motion which will start the flow of circulating air through the air intake manifold to cool the engine air temperature. If the combine has not been in motion, particularly if the combine has recently been in use (or the engine otherwise has been running), the air intake manifold may contain stagnant air (i.e. warmer than ambient outside air). Under certain circumstances, if there is no flow of circulating air to lower the engine air temperature, there will be an elevated engine air temperature that is due only to the fact that there is no flow of circulating air. When the combine is set in motion, this stagnant air is replaced with circulating air, which will tend to reduce the engine temperature. The delay is a length of time suitable to allow the operator to set the combine in motion and begin a flow of circulating air to lower the air temperature in the air intake manifold.

The engine air temperature is monitored (step 7) and compared to the upper limit temperature of the warning range (step 9). If the temperature is below the upper limit of the warning range, it is then compared to the lower limit of the warning range and whether it has been above the upper limit by checking if the warning flag ($W_{FLAG}$) is set (step 11). If not, a warning condition will be determined not to exist. Any pre-existing indications of a warning condition, such as provided by a warning lamp, audible alarm, warning flag and alarm timer will be reset (step 13). Monitoring of the engine air temperature (step 7) will continue at a regular interval. During normal operation of the combine, under conditions that will not result in any substantial risk of overheating of the engine, it would be expected that the process operate at this point (steps 7 through 13) in an essentially continuous loop. (According to a preferred embodiment, the "engine air temperature" is actually derived from a signal representative of the engine air temperature, provided by a sensor within the air intake manifold.)

Various circumstances may cause the engine air temperature to rise to (or beyond) the warning range. For example, if the air filter screen is obstructed wholly or partially so that the flow of circulating air to the engine is reduced, there may be an elevated engine air temperature. The engine air temperature may also rise to the warning range if the combine is under a heavy load, as when harvesting quickly, or when other loads are placed on the engine in combination with the feeder.

In the event that the engine air temperature is monitored (step 7) and the temperature is above the upper limit temperature of the warning range (step 9), the temperature is compared to the upper limit of the danger range (step 15). If not, the temperature is compared to the lower limit of the danger range and whether it has been above the upper limit by checking if the danger flag ($D_{Flag}$) is set (step 17). If not, a danger condition will be determined not to exist, and any pre-existing indications of a danger condition, such as provided by a timer, danger flag, feeder off and display on will be reset (step 19). But, a warning condition is indicated. Indication of the warning condition includes setting the warning flag (step 21), the warning lamp being activated (step 23) and the alarm timer being incremented (step 25). The alarm timer ($t_A$) is compared to a predetermined fixed period of time, $t_{ALARM}$ (step 27), and if the alarm timer is less, the audible alarm is activated (step 29) to provide an alert signal. Otherwise, the audible alarm is de-activated (step 31). The alarm timer ($t_A$) is set to $t_{ALARM}$ (step 33) to keep the alarm time from wrapping around and starting over. The combine is then in the warning condition (i.e. the warning lamp remains activated).

If the engine air temperature is determined to be within the warning range, and the operator is informed of the existence of the warning condition of the combine (steps 21 through 31), the operator will be expected to take prompt action to lower the engine air temperature. The operator can lower the engine air temperature, for example, by slowing the rate of harvesting of the combine, by cleaning the air filter screen (i.e. removing matter that may be wholly or partially obstructing air flow), or by taking other corrective action. If the operator does not take action to lower the engine air temperature, the engine air temperature may continue to rise until it is within a-danger range.

Monitoring of the engine air temperature (step 7) continues. If the temperature has fallen below the upper limit of the warning range (step 9), but not below the lower limit and the warning flag is set (step 11), the alarm timer $t_A$ is incremented (step 25). Monitoring of the engine air temperature (step 7) will continue at a regular interval. If the engine air temperature has fallen below the lower limit temperature of the warning range (step 11), the combine is no longer in the warning condition. If the temperature is and remains below the lower limit of the warning range, neither a warning condition nor a danger condition will be determined to exist. Any pre-existing indications of a warning condition or danger condition that may have existed, such as provided by the warning lamp or audible alarm, will be reset (step 13).

If the engine air temperature is above the upper limit of the danger range (step 15), the combine is in a danger condition. The warning lamp (which was activated when the combine was in the warning condition) will flash (step 35), and the audible alarm will be activated to provide a continuous alert signal (step 37). The danger condition flag ($D_{FLAG}$) will be set (step 39). The danger condition timer will be incremented (step 41) to measure the period of time (t) the combine is in the danger condition.

The danger condition timer will be compared to determine whether the combine has been in a danger condition for longer than a predetermined period of time ($t_{MAX}$) (step 43). Until the combine has been in the danger condition for the predetermined period of time, no other action will take place, monitoring of the engine air temperature (step 7) will continue at a regular interval (with the warning lamp flashing and the audible alarm activated).

Monitoring of the engine air temperature will continue at a regular interval. If the temperature has fallen below the upper limit of the danger range (step 15), but not below the lower limit and the warning flag is set (step 17), the timer is incremented. Once the combine has been in the danger condition for the predetermined period of time, the timer is set to $t_{MAX}$ (step 45) to keep the alarm time from wrapping around and starting over, the header/feeder will be commanded off to prevent overheating of the engine (step 47), and an informational display (e.g. sequentially indicating "HOT" ... "FDR" ... "OFF") will be provided (step 49) for the operator. (That the header/feeder is off should also be visible to the operator.)

If the temperature is above the lower limit temperature of the danger range, monitoring of the engine air temperature (step 7) will continue at a regular interval (with the header/feeder off, the warning lamp flashing, and the audible alarm activated). The combine is in the danger condition.

If the temperature falls below the lower limit temperature of the danger range (step 17), the informational display will be turned off, the timer reset, the danger flag cleared and the feeder will no longer be commanded off (step 19). The header/feeder will remain off until manually reset by the operator. The warning flag will be set (step 21) and the warning lamp will no longer flash but will be on continuously (step 23). The alarm timer will be incremented (step 25) but since the alarm timer has not been reset and is greater then $t_{ALARM}$ (step 27), the audible alarm is turned off (step 31). The alarm timer ($t_A$) is set to $t_{ALARM}$ (step 33) to keep the alarm time from wrapping around and starting over. Monitoring of the engine air temperature (step 7) will continue at a regular interval.

If the engine is turned off at any point during the process, the process will begin again (step 1) when the engine is re-started or the ignition key is turned to the "ON" position.

As is readily apparent to those of ordinary skill in the art who review this disclosure, alternative embodiments of the process can be implemented using variations (or other sequential combinations of) the steps outlined according to the preferred embodiment. Moreover, the existence of a warning condition or danger condition can be indicated according to any of a variety of alternative visual and/or audible information displays.

According to a particularly preferred embodiment of the invention, certain process parameters are pre-determined with designated values: The engine air temperature (signal) is monitored every ten milliseconds. The initial delay is about thirty seconds, and the predetermined time period $t_{max}$ is about thirty seconds. The upper limit temperature of the warning range ($T_{W1}$) is about 68.0° C. (±1.7° C.), and the lower limit temperature of the warning range ($T_{W2}$) is about 67.5° C. The upper limit temperature of the danger range ($T_{D1}$) is about 73° C. (±1.7° C.), and the lower limit temperature of the danger range ($T_{D2}$) is about 72.5° C. To indicate a warning condition of the combine, the warning lamp is preferably steadily lit; to indicate a danger condition the warning lamp may flash at between 0.75 and 1.25 Hz. The audible alarm is preferably a steady beep for a predetermined time ($t_{ALARM}$) of about four seconds in the warning condition, but will hold steady in the danger condition of the combine.

As one of ordinary skill in the art who has reviewed this disclosure would understand, the various threshold, start and predetermined values and ranges and system parameters will vary from one work vehicle to the next. When the control scheme is implemented in a software program, such values and ranges can be conventionally programmed into the controller to achieve desired or suitable control during the process.

Although only a few exemplary embodiments of this invention have been described in detail above, those skilled in the art will readily appreciate that many modifications are possible in the exemplary embodiments without materially departing from the novel teachings and advantages of this invention. As is readily indicated, the invention can be employed with any of a variety of vehicles. The particular values of the ranges, signals and control program may vary within the spirit of the present invention from vehicle to vehicle depending on particular static and dynamic characteristics presented. Accordingly, all such modifications are intended to be included within the scope of the invention as defined in the following claims. In the claims, each means-plus-function clause is intended to cover the structures described herein as performing the recited function and not only structural equivalents but also equivalent structures.

Other substitutions, modifications, changes and omissions may be made in the design, operating conditions and arrangement of the preferred embodiments without departing from the spirit of the invention as expressed in the appended claims.

What is claimed is:

1. An apparatus for protecting an engine of a work vehicle driving a load from overheating, the apparatus comprising:
    a sensor configured to provide a temperature signal representative of a temperature of the engine of the vehicle;
    a controller responsive to the temperature signal, configured to provide a control signal and also configured to disengage the load from the engine when the temperature signal indicates that the temperature of the engine is within a danger range; and
    an instrumentation system responsive to the control signal and configured to provide at least one warning signal,
    wherein the at least one warning signal is provided by the instrumentation system when the temperature signal indicates that the temperature of the engine is within a warning range, and the load is disengaged by the controller when the temperature signal indicates that the temperature of the engine is within the danger range so that the engine is protected from overheating.

2. The apparatus of claim 1 wherein the instrumentation system further comprises:
    a warning lamp coupled to the controller and configured to provide a visible warning signal;
    an audible alarm configured to provide an audible warning signal; and
    a display configured to provide a display signal representative of an operating condition of the vehicle.

3. The apparatus of claim 1 wherein the warning range has a first upper limit temperature and the danger range has a second upper limit temperature that is greater than the first upper limit temperature.

4. The apparatus of claim 1 wherein the sensor is a negative resistive element.

5. The apparatus of claim 1, wherein the instrumentation system is adapted to provide at least one overheat signal.

6. The apparatus of claim 1, wherein the load is disengaged only if the temperature signal indicates that the temperature of the engine is within an overheat range for a predetermined period of time.

7. The apparatus of claim 6 wherein the danger range is the overheat range.

8. The apparatus of claim 1, wherein a delay occurs before the load may be disengaged.

9. The apparatus of claim 8, wherein the delay is at least thirty seconds.

10. The apparatus of claim 1, wherein the vehicle is a combine.

11. The apparatus of claim 10, wherein the load is a feeder.

12. The apparatus of claim 1 wherein the sensor is configured to provide a temperature signal representative of a temperature of a fluid.

13. The apparatus of claim 12 wherein the fluid is air in the vicinity of the engine.

14. The apparatus of claim 13 wherein the warning range is between 69.7° C. and 65.8° C.

15. The apparatus of claim 13 wherein the danger range is between 74.7° C. and 70.8° C.

16. The apparatus of claim 12 wherein the fluid is intake manifold air.

17. The apparatus of claim 1 wherein the work vehicle is a harvesting vehicle and the load is a feeder and the instrumentation system is located in an operator compartment of the harvesting vehicle.

18. A method of protecting an engine of a vehicle driving a load from overheating, the method comprising the steps of:

(a) detecting a temperature signal indicative of a temperature of the engine;
(b) determining from the temperature signal whether the temperature of the engine is within a warning range;
(c) providing a warning signal if the temperature signal indicates that the temperature of the engine is within the warning range;
(d) determining from the temperature signal whether the temperature of the engine is within an overheat range;
(e) measuring a time duration that the temperature of the engine is within an overheat range; and
(f) disengaging the load from the engine only if the time duration that the temperature signal indicates that the temperature of the engine has been within an overheat range exceeds a predetermined period of time.

19. The method of claim 18 wherein the step of measuring the temperature of the engine further comprises the step of providing an initial delay of a predetermined amount of time before measuring the temperature of the engine.

20. The method of claim 18 wherein the load is a harvesting vehicle.

21. The method of claim 18 further comprising the step of providing a display signal when the temperature signal indicates that the temperature of the engine is within the overheat range.

22. The method of claim 18, further comprising the step of providing a display signal when the load has been disengaged.

23. The method of claim 18 wherein the overheat range is a danger range.

24. An apparatus for protecting an engine of a vehicle driving a load from overheating, the apparatus comprising:
   (a) means for detecting a temperature signal indicative of a temperature of the engine;
   (b) means for determining from the temperature signal whether the temperature of the engine is within a warning range;
   (c) means for providing a warning signal if the temperature signal indicates that the temperature of the engine is within the warning range;
   (d) means for determining from the temperature signal whether the temperature of the engine is within an overheat range;
   (e) means for measuring a time duration that the temperature of the engine is within an overheat range; and
   (f) means for disengaging the load from the engine only if the time duration that the temperature signal indicates that the temperature of the engine has been within an overheat range exceeds a predetermined period of time.

25. The apparatus of claim 24 wherein the step of measuring the temperature of the engine further comprises the step of providing an initial delay of a predetermined amount of time before measuring the temperature of the engine.

26. The apparatus of claim 24, wherein the load is a harvesting vehicle.

27. The apparatus of claim 24, further comprising means for providing a display signal when the temperature signal indicates that the temperature of the engine is within the overheat range.

28. The apparatus of claim 24, further comprising means for providing a display signal when the load has been disengaged from the engine.

29. The apparatus of claim 24 wherein the overheat range is a danger range.

* * * * *